United States Patent

[11] 3,609,704

[72] Inventor Werner H. Schurter
Columbus, Ohio
[21] Appl. No. 863,894
[22] Filed Oct. 6, 1969
[45] Patented Sept. 28, 1971
[73] Assignee Bell Telephone Laboratories, Incorporated
Murray Hill, Berkeley Heights, N.J.

[54] MEMORY MAINTENANCE ARRANGEMENT FOR RECOGNIZING AND ISOLATING A BABBLING STORE IN A MULTISTORE DATA PROCESSING SYSTEM
7 Claims, 5 Drawing Figs.

[52] U.S. Cl. .......... 340/172.5, 235/153
[51] Int. Cl. .......... G06f 11/00
[50] Field of Search .......... 235/157, 153; 340/172.5, 146.1

[56] References Cited

UNITED STATES PATENTS

| | | | |
|---|---|---|---|
| 3,080,548 | 3/1963 | Hagen et al. | 340/172.5 |
| 3,252,149 | 5/1966 | Weida et al. | 340/172.5 |
| 3,312,947 | 4/1967 | Raspanti | 340/172.5 |
| 3,370,274 | 2/1968 | Kettley et al. | 340/172.5 |
| 3,387,262 | 6/1968 | Ottaway et al. | 340/172.5 X |

*Primary Examiner*—Paul J. Henon
*Assistant Examiner*—Melvin B. Chapnick
*Attorneys*—R. J. Guenther and James Warren Falk

ABSTRACT: A data processing system wherein the central processors are duplicated and are associated with a group of duplicated memory storage units over a set of duplicated communications buses is disclosed. Each memory unit is identified by a unique name code as well as a unique identification word stored in the memory unit independently of the name code. After a particular memory unit is addressed, the identification word received by the central processor in response thereto is analyzed for determining and isolating any babbling store which spuriously responds to the addressing of the desired memory unit.

MEMBER NO = $\left(\frac{m-1}{2}\right) = \frac{n}{2}$

INVENTOR
W. H. SCHURTER
BY Howard R Popper
ATTORNEY

MEMORY MAINTENANCE ARRANGEMENT FOR RECOGNIZING AND ISOLATING A BABBLING STORE IN A MULTISTORE DATA PROCESSING SYSTEM

BACKGROUND OF THE INVENTION

This invention relates to memory storage arrangements in self-checking and/or self-diagnosing data processing systems and, more particularly, to systems in which a plurality of memory units are associated with some processing unit (s) over a common bus transmission system.

In many data processing applications, the memory storage required for the data to be processed and the programming instructions for processing the data may be subdivided in several distinct memory units or "stores." This may be desirable for various reasons: to separate instruction memory and data memory, to provide modular system design, to provide for future growth, or, in duplicated memory systems, to improve the chances of system recovery in the presence of multiple component failures.

The reads instructions and data from, and writes data into, the stores via a transmission bus. While the use of a direct bus from the processor to each store individually would make the selection of a store immune to store failures, the greater cost and space expenditure is often not justifiable. Instead, an arrangement may be used in which the processor reads and/or writes into some or all stores via a common bus. A given store then responds only if it recognizes a word address as being in its address range. The address may comprise two groups of bits, the first group designating the particular store and a second group being the "relative address," i.e., the desired location within the store.

Circuit component failures during writing, storing, or reading of information can be detected by redundant bit information (error codes, parity), by duplication and data matching, or special indicator leads. It is common practice to use the common bus for the checking information as well as the data.

Typically, detection of a store failure results in an interrupt of the normal data processing program. A fault-recognition program then identifies the store containing the failure, takes it out of service, returns o data processing, and in due time a diagnostic program identifies the failing circuit, or circuit component.

It has been discovered that certain circuit failures in a store may cause this store to "babble," i.e., to respond to a read command even though another store is addressed. The babbling store sends answer information simultaneously with, and usually different from, the properly responding store (referred to as the "addressed store"). The resulting data appears mutilated at the processor end and will fail one or several error checks. In response, the fault recognition program suspects the addressed store and takes it out of service although it does not contain the failure. The babbling store, on the other hand, will remain in service. It will make successful diagnostics of the good store unreliable and, in addition, may cause other good stores to go out of service.

While babbling-store failures are infrequent, the disruptive effects which they can produce are a matter of serious concern in self-checking systems. Heretofore, the only alternative was provision of private checking paths to each individual store on a bus. This is not only expensive but difficult to implement in a system designed for future growth in memory size.

SUMMARY OF THE INVENTION

In accordance with the present invention, a procedure is followed which precedes the running of conventional fault recognition and diagnostic programs and whose purpose it is to determine whether a babbling store was the cause of the store failure. This is done by reading of a special identification word located in the store which was being addressed when the babbling occurred. In accordance with the invention, an identification word unique to the store is permanently stored at the same relative address in each store of the memory system. Next, the central processor compares the identification word received with the word expected to be returned. If the comparison verifies that the identification word was returned correctly, normal maintenance procedures may safely be followed inasmuch as no response from a nonaddressed store was obtained. However, if an incorrect identification word was returned, the cause could either be a failure of the addressed store or the existence of a babbling store. According to the invention, the structure of the identification in such that the processor, by analyzing its mutilated pattern, can directly identify the babbling store, if one exists, and temporarily disconnect it from the common bus. In order to determine whether the store so identified was in fact babbling, the identification word of the addresses store is then read again. If the correct identification is not obtained, the suspected babbling store is marked as being defective and a diagnostic program scheduled for it. If the correct identification word is not obtained, the addressed store may safely be marked as being defective and normal maintenance procedures should pinpoint the trouble.

Accordingly, a feature of the present invention is the analysis of a mutilated identification word obtained from one store to locate another store which exhibits a spurious response.

It is another feature of the present invention to mask from the identification word obtained from the first store all of the bits which correspond to the bits of the expected identification word of that store and to identify such other store by analysis of any remaining unmasked bits.

It is another feature of the present invention temporarily to prevent such store identified by the remaining unmasked bits from delivering any readout data to the common bus.

It is another feature of the present invention to determine that the initially addressed store is defective when, upon such readdressing, an incorrect identification word continues to be obtained and, on the other hand, to determine that the temporarily inhibited store was defective when a correct identification word is obtained.

DESCRIPTION OF THE DRAWING

The foregoing and other features of the present invention may become more apparent by reading the following detailed description of one implementation of the invention, together with the drawing; in which.

GENERAL DESCRIPTION

Figure 1:
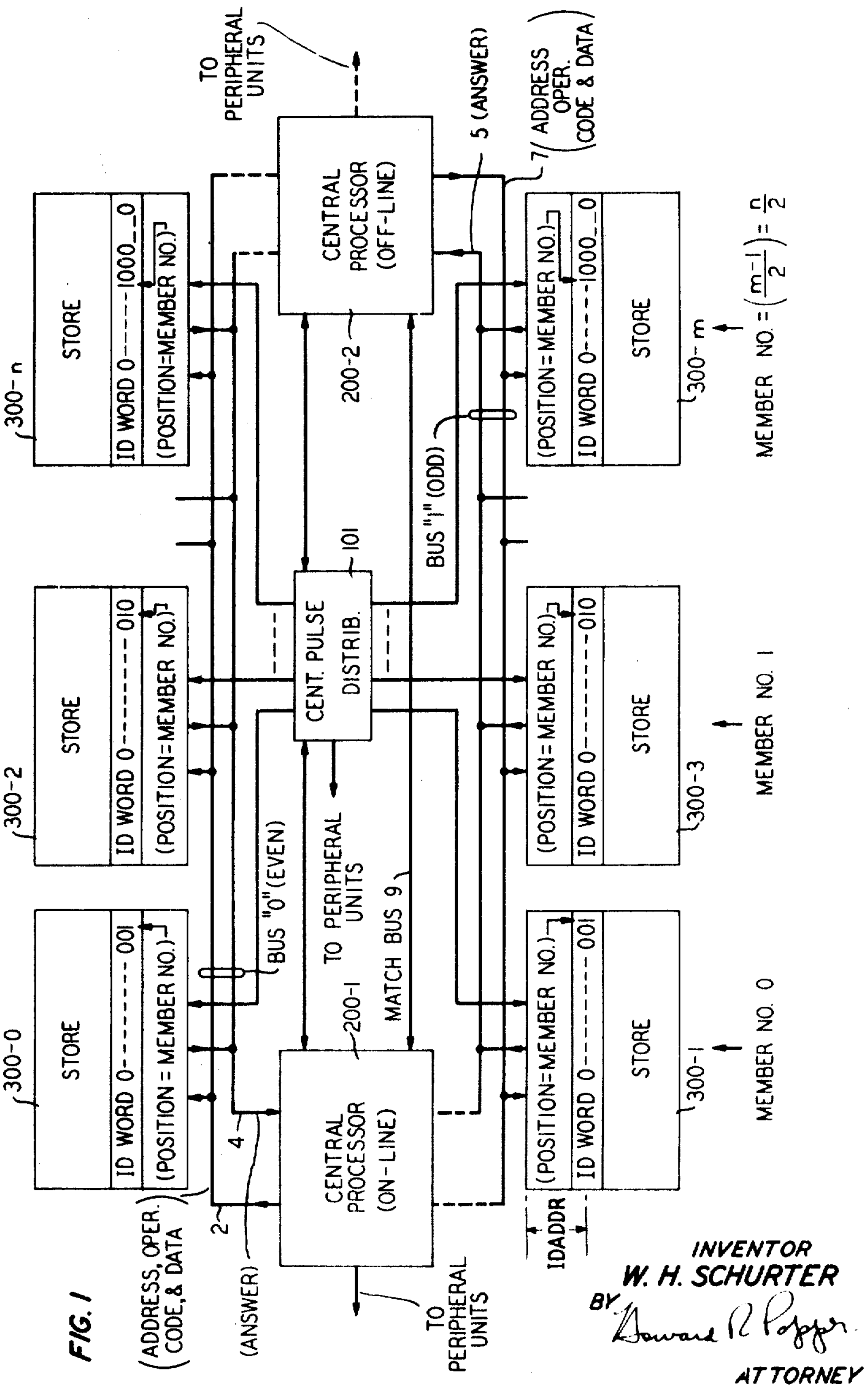
FIG. 1 shows a block diagram of the duplicate processor, bus transmission system, and stores wherein each store has an identification word stored therein for implementing the maintenance arrangement of the present invention.

Referring to FIG. 1, a data processing system is shown in which, for purposes of achieving high operating reliability, certain equipments are duplicated. A pair of central processors 200–1 and 200–2 are shown associated with a pair of transmission buses by means of which the processors communicate with the plurality of stores 300. Within a bus, the conductor leads are grouped according to their function. In normal operation, one of the central processors such as processor 200–1 will be "on-line" or active, i.e., exercising control over the peripheral units (not shown), such as circuits to control and monitor a telephone switching network. Within either bus, the conductor leads are grouped according to their function. For example, the on-line central processor might transmit the store address, along with a read, write or maintenance operation code and in case of a write, also the data to be stored, over the processor-to-store transmission conductors 2 to its associated group of stores 300–0, 300–2...300–N. In case of a read, the answer information is transmitted over the store-to-processor conductors 4 of the same transmission bus such as bus"0." The off-line processor 200–2 will normally be transmitting information simultaneously to its associated group of stores 300–1, 300–3...300–M over processor-to-store conductors 7 and receiving information over store-to-processor conductors 5 of its associated bus "1." Periodically, processors 200–1 and 200–2 will compare their duplicate information over match bus 9 to verify proper processor performance. In addition to the processor, paired buses, and duplicate stores, the data processing system includes a central pulse distributor 101 for controlling peripheral units and for transmitting control signal that set control flip-flops in the various stores for the purpose of adding or removing such stores from the operating configuration.

In the illustrative system each store is permanently assigned to one or the other the duplicate buses. Thus, the even numbered stores 300–0, 300–2...300–N are permanently assigned to bus"0," while the odd numbered stores 300–1, 300–3...300–M are permanently assigned to bus "1". On the other hand, the on-line central processor may select either of the buses as the on-line or active bus. This selection by the processors of which bus shall be the on-line bus necessarily characterizes the stores associated with that bus as the on-line group of stores.

Inasmuch as corresponding stores on the respective buses contain identical information, it is convenient to refer to such duplicate set of stores by a single designation which will be known herein as the member number of the duplicate set. Thus, store 300–0 of the even bus and store 300–1 of the odd bus are assigned member number 0, stores 300–2 and 300–3 are assigned member number 1 and so on. In accordance with the principles of the present invention, each store contains a permanent identification word at the same predetermined relative address. The identification words for stores having the same member number are identical. The identification word contains a single binary "1" bit in field of binary "0s." The position of the binary "1" bit in the identification word is advantageously the same as the member number of the store (see FIG. 1). Thus, each store on a particular bus has an identification word uniquely identifying that store. If, due to a circuit fault, two identification words are received simultaneously by the processor, the babbling store can always be identified by the position of the unwanted bit. The DRMO circuit of the processor can be used for this purpose, as further described below.

In the illustrative system of FIG. 1, the stores 300 are of magnetic twister type each having a capacity of $2^{14}$ words, with each word containing 40 data bits and 7 error check bits. Stores 300 contain either program information or data, or both. Duplicate store information is used as backup after store failures.

On detection of any store trouble, a wired-in interrupt feature will immediately stop the off-line processor and cause the online processor to transfer to a fault recognition program as mentioned earlier. This program is stored in the "base store," a store which contains all the programs and data essential for recovery after a store failure or other critical trouble. To ensure that the fault recognition program is never executed from a failing store, the processors switch buses, at time of interrupt, whenever the failure indication comes from the on-line bus. For obvious reasons, this automatic bus switch is skipped whenever the duplicate copy of the on-line base store is out of service. The on-line base store is referred to a s "controlling store."

Figure 2:
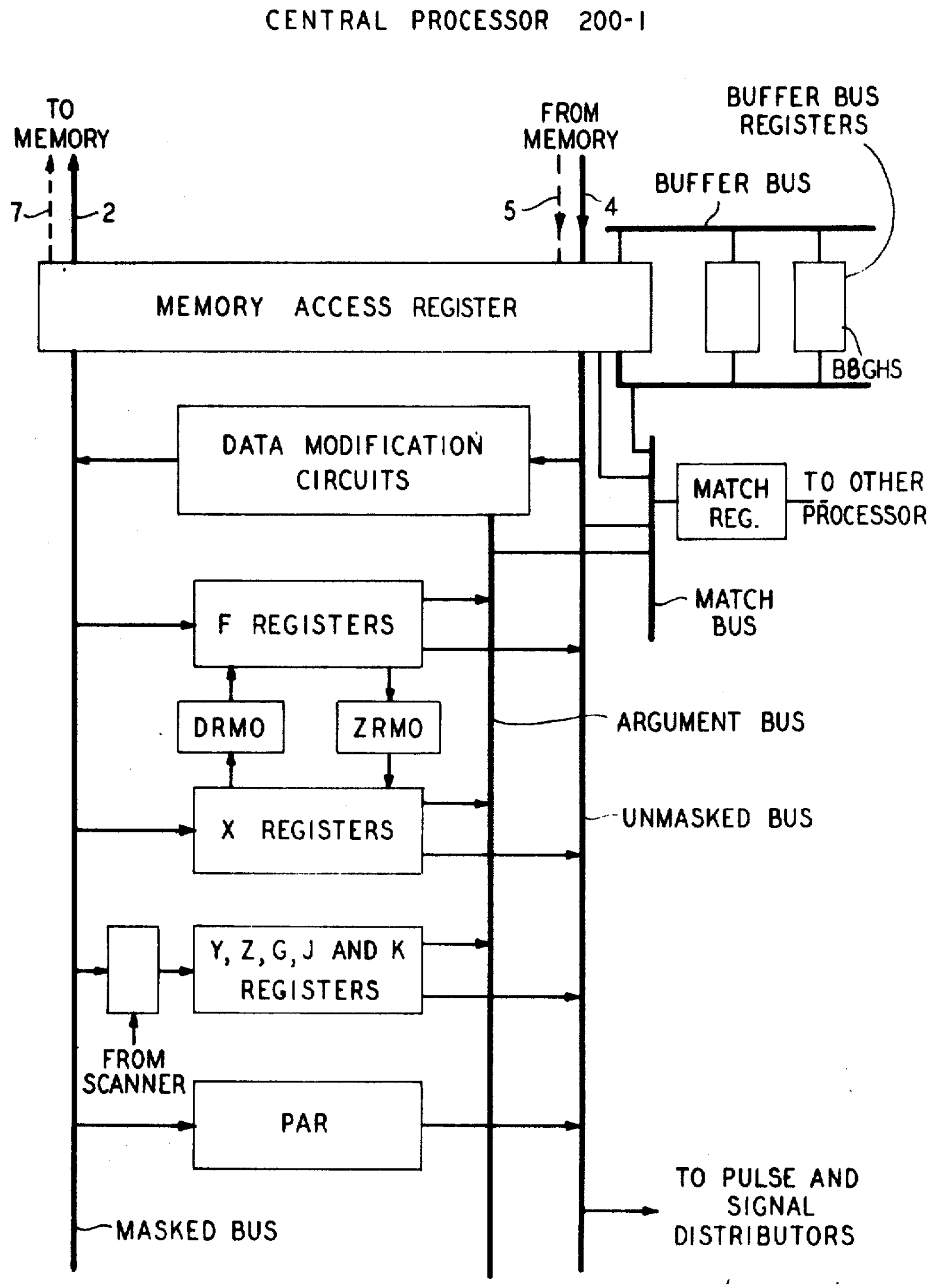
FIG. 2 shows a more detailed diagram of a central processor of FIG. 1.

Referring now to FIG. 2, there are shown in somewhat more detail the elements comprising the central processor. Such a central processor is more completely described in A. W. Kettley et al. U.S. Pat. No. 3,370,274 which issued Feb. 20, 1968. Briefly, however, the central processor sends information such as store word address, operation code, and data over the processor-to-store conductors such as conductors 2 or 7 and receives information over the answer or store-to-processor conductors such as conductors 4 or 5 of the even or odd transmission buses, respectively. The internal logic of the central processor handles the 20-bits bits comprising one-half of a storage word in parallel. There are seven 20-bit general-purpose registers numbered F, X, Y, Z, G, J, and K. As shown in FIG. 2, the internal organization of the central processor can be viewed as being in the form of a letter H with the masked bus and the unmasked bus forming the vertical bars of the H and the data modification circuits being located on the horizontal bar of the H. There is a general equivalence of register and memory locations, both the memory and the internal registers of the central processor being connected between the masked and unmasked buses with their inputs and outputs connected in the opposite sense to that of the data modification circuits. This arrangement forces data to pass through the data modification circuits whenever it is moved from the memory to one of the internal registers, from a register to memory, or from one register to another. The argument bus allows the internal registers to supply a second argument to the data modification circuits. The data modification circuits are combinational logical networks and provide for shifting or rotation, left or right, by any number of bit positions from 0 through 20. The data modification circuits also provide for complementing, AND, OR, and exclusive-OR logical operations as well as subtraction and addition. Insertion masking is provided on orders which call for writing into memory. During insertion masking, only those bit positions of the data are transmitted and inserted for which there are "1s" in the mask; the bits of the memory location are unchanged in those positions where there are "0s" in the mask. While all of the internal registers are general purpose, the X register is provided with two additional logic circuits DRMO and ZRMO, respectively. The DRMO circuit is capable of detecting the rightmost "1" bit in the 20-bit word contained in the X register and of entering into the F register the position which the "1" bit occupied in the X register. The ZRMO circuit is capable of zeroing the rightmost "1" in the 20-bit word in the X register.

Associated with the memory access register is a buffer bus which includes a plurality of buffer flip-flop registers, such as flip-flop B8HS. These buffer registers store information concerning the current operational status of the processor. In particular, flip-flop B8GHS stores the number of the bus being addressed. Additional background information concerning the operation of the central processor may be had by referring to the above-mentioned Kettley patent.

Figure 3:
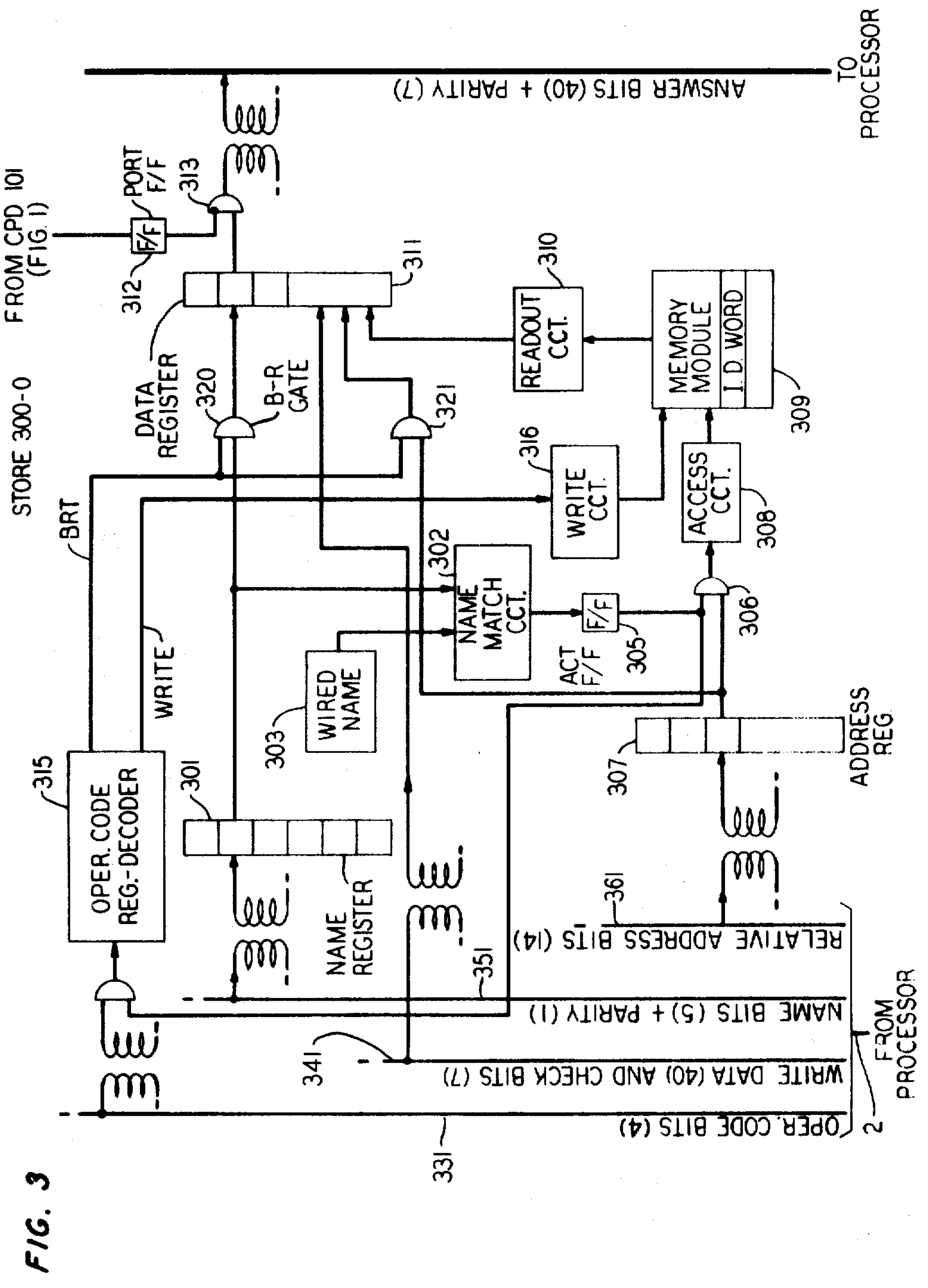
FIG. 3 shows a simplified diagram of the store having the identification word of FIG. 1 stored therein.

In FIG. 3, the processor-to-store bus 2 contains groups of conductors 331, 341, 351, and 361 which enter the store at the lower left-hand portion of the FIG. The leftmost of these conductors 331 may be activated by a processor to provide a four-bit operation code to designate whether the store is to be read out, written into, or accessed for maintenance purposes. The next group of conductors 341 can be activated by a processor to provide 40 bits of data and seven check bits if data is to be written into the store. The central processor designates which store is to be addressed by activating the next group of conductors 351. These carry the five-bits of the store name (code unique to a store member) plus a parity bit. The last group of processor-to-store conductors 361 in cable 2 provide the relative address (14 bits) of the particular location to be addressed. With 14 bits used for relative addressing, up to $2^{14}$ words of memory may be accessed. With five-bits assigned to the function of naming a store, up to 32 store members can be equipped.

When information is to be read out of a store, a read operation code, the store name and the relative address are applied as inputs to the store on the processor-to-store transmission bus. The five high order bits of the address are the store name and are registered in the store name register 301. Each store is permanently assigned its distinctive five-bit name be a variable circuit designed wired name 303. Name match circuit 302 compares the contents of name register 301 with the name provided by wired name 303 and activates activity flip-flop 305 when a match occurs. Activity flip-flop 305, when set by match circuit 302, enables AND gate 306. AND gate 306 allows the relative address registered in address register 307 to be applied to memory module access circuit 308. The word in memory module 309 at the addressed location is amplified by readout circuit 310 and inserted into data register 311 from which it is normally applied on the store-to-processor conductors of its associated transmission bus. For the purpose of isolation in a complex trouble situation, the store may have PORT flip-flop 312 set by a signal from central pulse distributor (CPD) 101. When PORT flip-flop 312 is set, gate 313 is inhibited and prevents data register 311 from delivering its contents to the answer leads of its associated store-to-processor bus.

On write orders, operations are the same except that operation-code register-decoder 315, in response to registering a write order, will activate write circuit 316 to write the data applied over the write data leads of the processor-to-store bus into memory module 309. For the purpose of a special diagnostic test, the bus-register test, AND gates 320 and 321 can be enabled to pass the contents of name register 301 and address register 307 directly to data register 311 and thence back to the processor over the answer conductors of the store-to-processor bus. During the bus-register test, the central processor can verify, among other things, whether the store correctly registered the transmitted name bit pattern.

Problem of the Babbling Store (see FIG. 3)

From the above description of FIG. 3, it is seen that the five name bits designating a particular store must be correctly received and registered in name register 301. If the name register 301 of a store which is addressed does not correctly register these bits, the addressed store will not be accessed because name match circuit 302 will not recognize the correct bit pattern in register 301. On the other hand, if the name register 301 of a nonaddressed store incorrectly registers a name bit pattern in such a way that they appear to be the same as that in wired name 303, name match circuit 302 will allow the memory module 309 in this nonaddressed store to be interrogated even though the name bits transmitted on the name bit leads of bus 2 did not agree with the name pattern in wired name 303. Under these latter circumstances, the store will "babble" in the sense described earlier. In either case, the response received by the processor will be the responses of two stores OR'd together, and error checks in the processor will fail.

Upon such a parity failure detection, the central processor in the prior art system would take the originally addressed store out of service and execute a diagnostic program on it. In this program, the central processor would first run a bus-register test, i.e., it will once again address the same store, but in addition it will transmit a signal to operate gate 320 in the addressed store. This causes the name bits registered in register 301 to be transmitted directly to data register 311 and thence back to the processor. The outcome of the bus-register test depends on the component failure which causes babbling. If the failure is in the name register of the babbling store, the bus-register test fails since it explicitly tests the name register. The diagnostic result would pinpoint the failure to the proper circuit but to the wrong store, since the addressed store is not the store which babbles.

On the other hand, a store might have babbled because of a defect in the diode matrix of its name match circuit or in certain gating operations, so that its active flip-flop is erroneously set although the name register works correctly. Since the bus-register test does not use the affected circuit, it would pass. Depending on the exact structure of the remaining diagnostic tests, they either would all pass, or would fail with diagnostic output locating the failure both in the wrong store and the wrong circuit.

Regardless of whether the addressed store is left in service or not, store failures will continue to be caused by the babbling store in the working configuration of the prior art system. Each time, this causes a program interrupt which often involves automatic bus switching, as explained earlier, with its inherent hazard to program sanity. In addition, the complete diagnostic program will be called after each failure and each time takes up to several minutes to run. During this time, store duplication is lost, and system reliability is seriously jeopardized. Thirdly, the babbling store must be taken out of service by the operator's action since the maintenance programs are incapable of isolating a babbling store. Finally, diagnostic results will be unreliable.

Figure 4A:
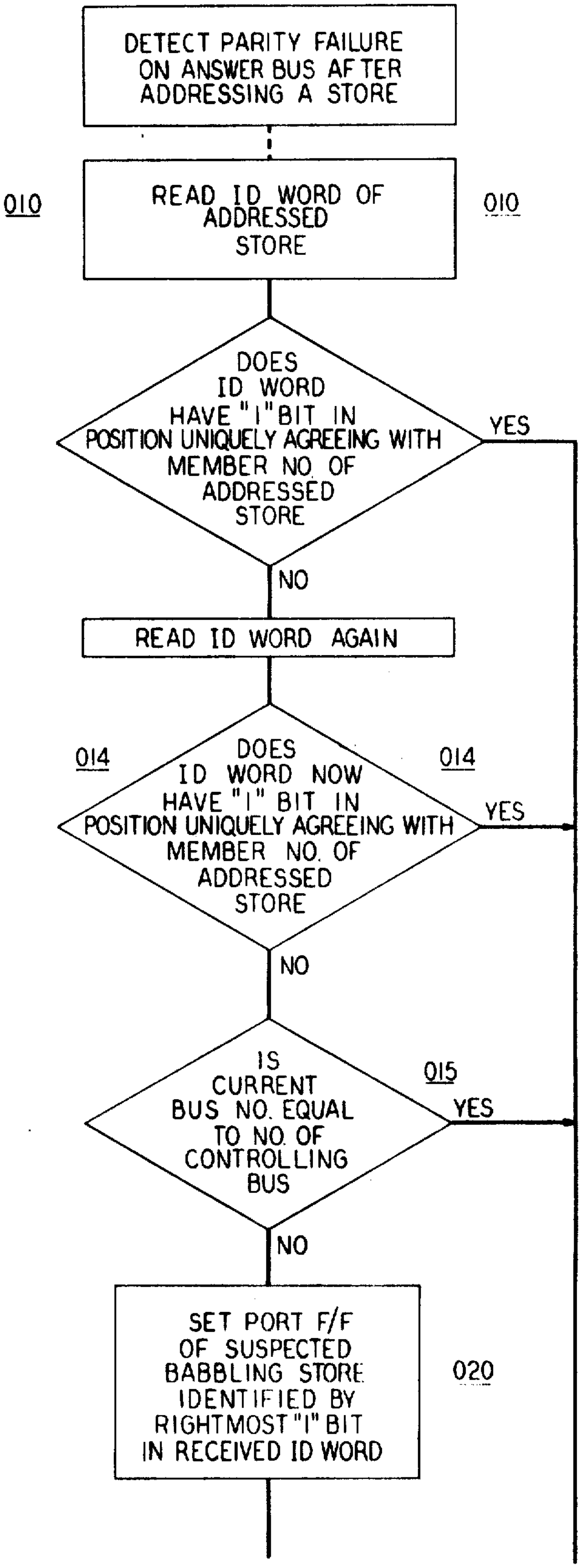
FIGS. 4A and 4B show a flow chart of an illustrative procedure for carrying out the maintenance arrangement of the present invention.
Figure 4B:
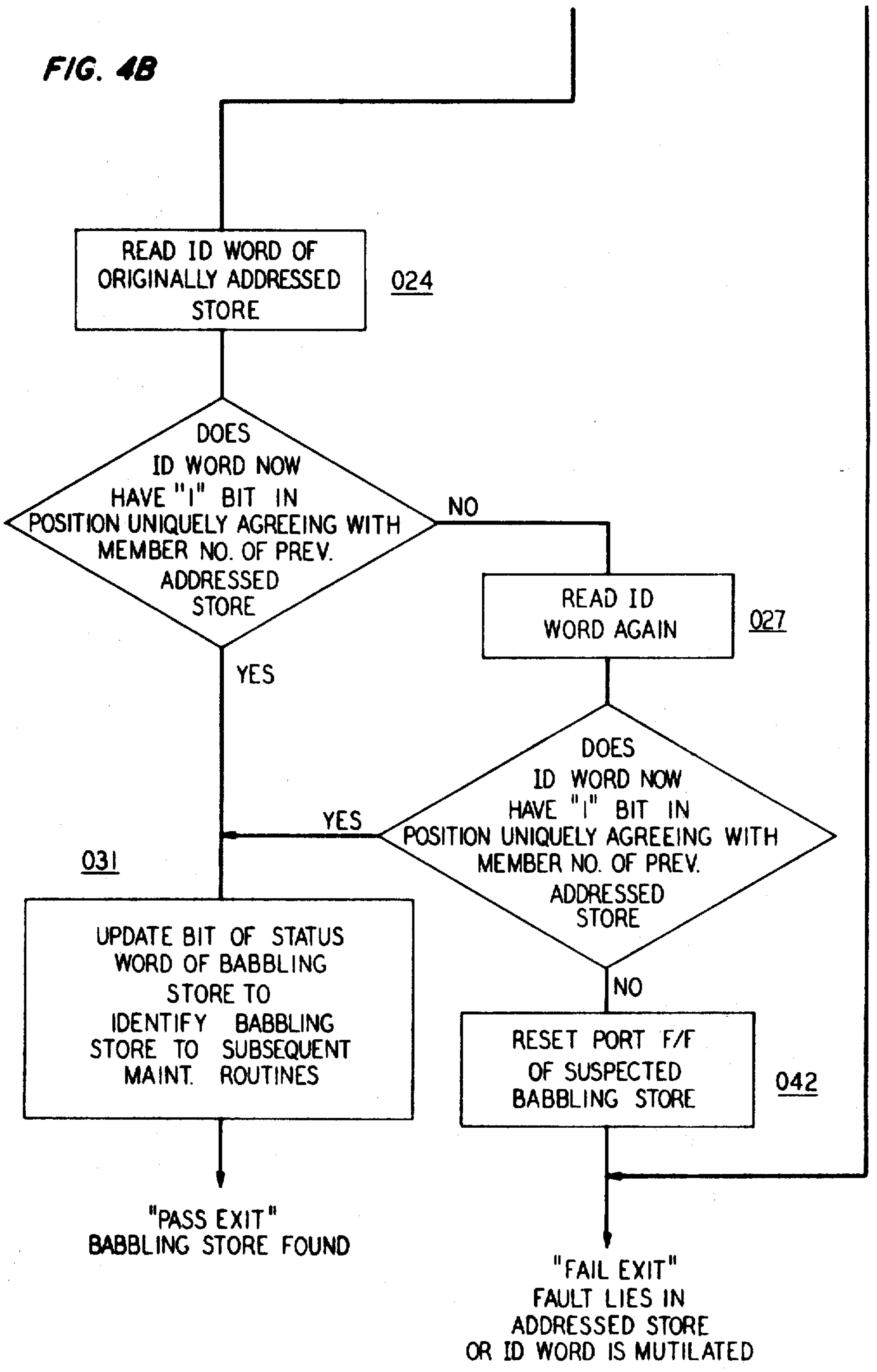

Referring now to FIG. 4, there is shown a flow chart of the process of the present invention by means of which a babbling store is recognized and isolated in the illustrative system. The steps of the process may be implemented by a sequence of stored programmed instructions, which in the ensuing description will be assigned reference numbers so that the detailed steps hereinafter described may be correlated with the flow chart of FIG. 4. For each numbered step hereinafter there will also be given a mnemonic operation code as actually employed in one illustrative embodiment of the invention. The instructions constituting the steps of the process hereinafter described, as well as any data needed, are assumed to be stored in the base stores. When the processor detects a store failure, it may advantageously use the high order or name bits of the address which resulted in the store failure as an index to a translation table to obtain the unit number of the store which was addressed when the parity failure was detected.

In instruction 020, the PORT flip-flop of the suspected babbling store is set. This isolates the suspected store from its answer bus for all reading. If the suspected store is the controlling store, setting the PORT flip-flop would result in program insanity. In this case, the assumption is made that no babbling store is involved. This is acceptable, because if the duplicate copy of the controlling store had been in service, an automatic bus switch would have occurred, and the suspected store would no longer be the controlling store. So, since the duplicate copy is out of service, no recovery would be possible if the controlling store was in fact babbling. In order to determine whether the suspected store is the controlling store, instruction 015 compares a memory bit CSB which indicates the current controlling store bus with the flip-flop B8GHS which indicates the bus number of the addressed store.

In the ensuing description of an illustrative program sequence which implements the process of the present invention, it will be assumed at the outset that the hardware circuitry has detected a failure upon receiving the response from an addressed store. Each step of the illustrative sequence is separately identified at the left by a three digit number such as 003. To the right of this number is given a brief English language description of the step. To the right of the description is set forth the mnemonic of the instruction which consists of the mnemonic operation code, such as "Y2" in step 003. To the right of the operation code, and separated therefrom by a short space, is a combined data address and option field by means of which additional information concerning the operation to be performed is specified. For purposes of achieving greater clarity, the ensuing description will be presented in tabular form in table 1.

For the purposes of simplifying the description, it has been thus far assumed that the procedure for determining whether a babbling store contributed an erroneous response was initiated by a store failure detected by the processor in the course of processing useful data. However, such procedure can also be initiated in the course of systematic store tests, executed either due to failures other than store failures, or as preventive maintenance. The procedure for identifying the babbling store as described herein may advantageously be executed as the first portion of such store tests. Further and other variations will be apparent to those skilled in the art without departing from the spirit and scope of the invention.

TABLE I

| | | | | |
|---|---|---|---|---|
| | | Detect Parity Failure on Answer Bus | | |
| | | Obtain unit No. of addressed store by entering translation table with previously used address. Place unit No. in Y reg. | .. | .. |
| | 003 | Identify bus of addressed store by reading lowest order bit of unit No. | YZ | M1 |
| | 005 | Set GHS flip-flop to cause active processor to work with identified bus. | PCPDV | Z,GHS |
| | 006 | Truncate unit No. (divide by 2) to obtain member No. Place member No. in G reg. | YG | M20HR1 |
| | 007 | Using member No. obtain NAME bits of addressed store from table "B2NAME" and place in J register. | MJN | B2NAME,G |
| | 008 | Place a "1" bit into Z register in the position dictated by the member No. in the G register. (Word in Z register is expected ID word). | WZ | 1,,HGL |
| | 010 | Using store NAME bits for the addressed store and relative address IDADDR of ID word, readout ID word, exclusive-OR, this ID word with expected ID word in Z register and place result in X register. X register will be all "0" only if obtained ID word is as expected, otherwise X contains pattern of suspected babbling stores. | SX | IDADDR,J,EZ |
| | 011 | If ID word is correct, no babbling store exists and transfer to instruction 043. | TXZ | BABB30 |
| | 012 | If ID word is incorrect, re-address using NAME bits and relative address as in 010 to see if ID was wrong because of some transient condition. | SX | IDADDR,J,EZ |
| | 014 | If word now correct, it was a transient failure | TXZ | BABB30 |
| | 015 | If the failing store was on the controlling bus, "AND" the word in the X register w/−1, this clears the low-order bit so that only nonbase stores are considered as suspected babbling stores. | IF B8GHS,.EQ.,CSB, AND (X,−1,X) | |
| | 017 | Place into F register position of rightmost "1" in X register, this is member No. of first suspected babbling store. If X=0 go to FAIL exit since controlling store was the only suspected babbling store. | DRMO | BABB30 |
| | 018 | Place bus No. in X register | MØVE | B8GHS,X |
| | 019 | Multiply member No. of suspected babbling store by 2 and add current bus No. to get original unit No. of suspected babbling store back. | FX | M20HL1,ØX |
| | 020 | Set PORT flip-flop of suspected babbling store | STCPD | SET,PORT,X |
| | 022 | Take unit No. of addressed store (in Y register) trunc. (÷ by 2) to obtain member No. of addressed store and place in G register. | YG | M20HR1 |
| | 023 | Using member No., obtain NAME bits of addressed store from table "B2NAME" and place in J register. | MJN | B2NAME,G |
| | 024 | Re-test ID word | SK | IDADDR,J,EZ |
| | 025 | If ID word is correct (K reg. all "0") go to BABB10 | TKZ | BABB10 |
| | 027 | If ID word incorrect, repeat test | SK | IDADDR,J,EZ |
| | 030 | If ID word not correct on repeat test, transfer to BABB20. | TKU | BABB20 |
| | | Do instruction 031–041 if setting PORT flip-flop of suspected babbling store caused addressed store to give correct ID word. | | |
| BABB10 | 031 | Place current bus No. in Z register | MØVE | B8GHS,Z |
| | 032 | Set a "1" bit in G register in position dictated by F register (i.e., by member No. of suspected babbling store). | WG | 1,,HFL |
| | 033 | OR contents of store status word "STMAP" for bus given by Z register with word in G register and place result in "STMAP", i.e., update "STMAP" to record babbling store as maintenance-busy. | OR(STMAP,Z),G,((STM )AP,Z) | |
| | 034 | CALL DIAGNOSTIC PROGRAM Exit to calling sequence "PASS EXIT". | LODREQ 3; T* 2,J | |
| BABB20 | 042 | Reset PORT flip-flop of suspected babbling store | STCPD | RESET,PORT,X |
| BABB30 | 043 | Exit to calling sequence "FAIL EXIT" | T* 0,J | |

What is claimed is:

1. In a data processing system having a plurality of memory stores, a central processing unit and a transmission bus over which said processing unit may transmit to and receive from said stores, corresponding ones of said stores being arranged to store duplicate information, one store of each duplicate set of stores being an online store and the other thereof being an off-line store, a maintenance arrangement comprising the steps of:

addressing a predetermined location in any one of said memory stores returning an erroneous response to said central processing unit, said predetermined location having recorded therein a word uniquely identifying said one of said stores, decoding said word obtained from said predetermined location to identify another of said plurality of stores from any bits in said word not uniquely identifying said one of said stores, inhibiting said store identified by said decoding from delivering any response to said central processing unit, readdressing said predetermined location in said one of said memory stores to cause the delivery of its unique identifying word to said central processing unit, marking said first addressed store as defective when said last mentioned unique identifying word is incorrectly received at said central processing unit and marking said store identified by said decoding as defective when said last-mentioned unique identifying word is correctly received thereat.

2. A process for operating a data processing system employing a central processor and a plurality of data and instruction storage units addressable over a common bus comprising the steps of:

transmitting a readout command over said common bus from said central processor to obtain in said processor the contents of a predetermined storage location in one of said storage units, comparing in said processor a predetermined word unique to said one of said storage units with the contents of said predetermined storage location obtained by said processor to derive an error signal, examining said error signal to determine whether said signal corresponds to a predetermined contents of a storage location unique to any other of said storage units, transmitting an inhibit-readout command to said other of said storage units determined by said examining of said error signal, retransmitting a readout command to address said predetermined storage location in said one of said storage units, recomparing with said predetermined word unique to said one of said storage units the contents obtained by said central processor responsive to said retransmission of said readout command, marking said storage unit identified by said error signal as defective when said recomparing following said retransmitting shows said last-mentioned word and contents to be identical to each other, and marking said one of said storage units defective when said recomparing following said retransmitting shows said last-mentioned word and contents to be nonidentical.

3. A process for use in a stored program controlled system having a central processor, a plurality of duplicate stores for communicating with said processor, said process being adapted to detect whether an addressed or a nonaddressed one of said stores furnished an erroneous response to said processor, comprising addressing a predetermined location in the same one of said stores which when previously addressed resulted in said erroneous response, a corresponding predetermined location in each of said stores having stored therein an identification word containing a bit pattern unique to the respective store, ascertaining whether said identification word read from said store by said addressing contains any bits belonging to an identification word for another of said stores, inhibiting said another of said stores from responding to addressing, readdressing said predetermined location, ascertaining whether said identification word read from said store by said readdressing now contains the bit pattern unique to said addressed store, marking said another of said stores as defective when said identification word obtained by said readdressing is unique to said addressed store, and marking said addressed store as defective when said identification word obtained by said readdressing is not unique to said addressed store.

4. An arrangement for detecting a babbling store in a data processing system having multiple stores that are connected to a common transmission bus means, each store having an identifying word uniquely identifying that store in a predetermined memory location, the babbling store causing erroneous information to be present on said transmission bus means due to simultaneous readout from said babbling store and an addressed store, comprising means for registering an identifying word received over said bus means on readout of a store, means for exclusively O-ring the identifying word for the addressed store with said identifying word in said registering means, means for registering the resultant word from said exclusive O-ring means, and means for decoding said resultant word to ascertain the identity of a possibly babbling store.

5. In a data processing system the arrangement in accordance with claim 4 wherein said identification word uniquely designating each store comprises a single binary "1" in a field of binary "0s," and wherein said decoding means includes means for detecting the rightmost "1" in said resultant word.

6. In a stored program controlled data processing system having a central processor, a plurality of pairs of duplicate storage units associated with said processor, a pair of communications buses linking said processor with said storage unit pairs, said processor being adapted to address any one unit of said pairs of duplicate storage units over the respective one of said buses to obtain information stored in any addressable location thereof, said processor further being adapted to determine when a word obtained from one of said addressable locations in one of said storage units is in error and to request access to diagnostic routines stored in a predetermined one of said storage units, register means for indicating which of said units is said predetermined one of said units, a method for determining which of said storage units, if any, is defective, said method comprising the steps of:

1. addressing a predetermined storage location in the one of said storage units furnishing said word determined to be in error to readout an identification word, a corresponding predetermined location in each of said storage units normally containing a unique identification word,
2. marking said storage unit addressed in step 1 as defective when said unique identification word is correctly readout from said predetermined storage location,
3. responsive to said unique identification word being incorrectly readout determining from said register means whether said storage unit addressed in step 1 is said predetermined unit containing said diagnostic routines,
4. marking said storage unit addressed in step 1 as defective when said storage unit so addressed is determined to be said predetermined storage unit,
5. ascertaining whether said readout identification word contains any bits belonging to an identification word for another of said units,
6. inhibiting said another of said storage units from responding to any subsequent addressing,
7. readdressing said predetermined location of said storage unit addressed in step 1,
8. marking said storage unit addressed in step 7 as defective when said identification word is incorrectly readout, and
9. marking said another of said storage units as defective when said identification word is correctly readout responsive to said readdressing.

7. In a data processing system having a central processor, a plurality of stores, an access bus and an answer bus, each of said stores being assigned to said buses and each of said stores including means containing a store name unique to that store, means for matching said store name with a name code applied over said access bus to said store, and means controlled by said matching means for permitting locations in said store to be addressed, the combination comprising addressable location means at each of said stores distinct from said store name containing means for storing an identification word different from said store name and also unique to that store, said identification word normally comprising a single binary "1" in a field of binary "0s,"a means at one of said stores responsive to said matching means and to the appearance on said access bus of the address of said addressable location means for causing said identification word to be applied to said answer bus, and means at said central processor for detecting the presence of more than a single binary "1" in said identification word applied to said answer bus.